July 10, 1962     J. T. MONAGHAN     3,043,677
SINTERING METHOD AND APPARATUS
Filed Sept. 28, 1960
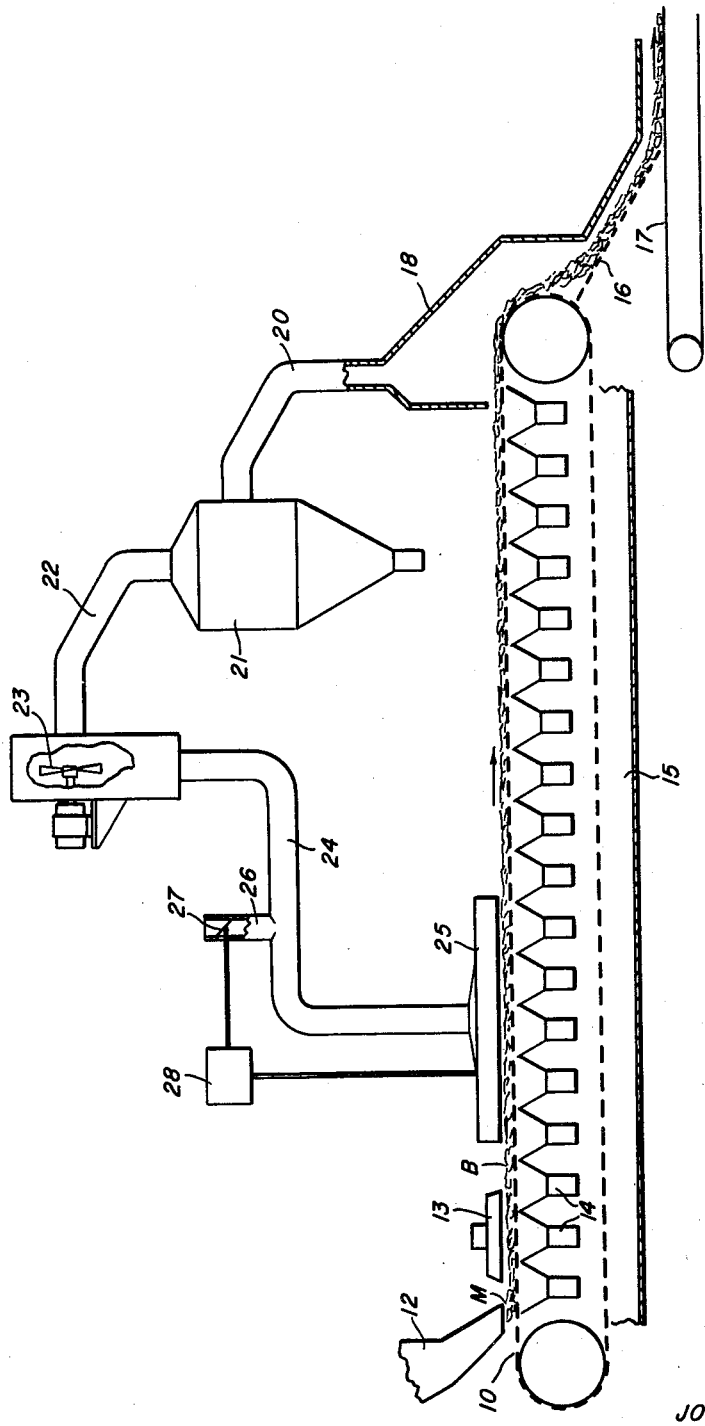
INVENTOR
JOHN T. MONAGHAN
By Donald G. Dalton
Attorney

3,043,677
SINTERING METHOD AND APPARATUS
John T. Monaghan, Chicago, Ill., assignor to United States Steel Corporation, a corporation of New Jersey
Filed Sept. 28, 1960, Ser. No. 59,094
2 Claims. (Cl. 75—5)

This invention relates to an improved method and apparatus for controlling dust and conserving sensible heat in a sintering operation.

When sintered material discharges from a traveling grate sintering machine, it usually breaks into fragments with formation of large amounts of dust. Conventional practice is to cover the discharge end of the grate with a hood and draw air through the hood to carry away this dust. The dust-laden air then goes to a suitable dust collector, such as a cyclone, where much of the dust is recovered. Nevertheless air leaving the dust collector still carries a significant quantity of dust which may pollute the atmosphere, as well as wasting material. Also this air is at a relatively high temperature, and its sensible heat is lost when it discharges into the atmosphere.

An object of my invention is to provide an improved method and apparatus for handling dust-laden air from a sintering operation in which additional quantities of dust are recovered and sensible heat is conserved.

A further object is to provide an improved method and apparatus for handling dust-laden air from a sintering operation in which air leaving a conventional dust collector returns to the sinter bed at a critical location where the remaining dust can blend with the bed and sensible heat promotes combustion.

In accomplishing these and other objects of the invention, I have provided details of structure, a preferred form of which is shown in the accompanying drawing, in which:

The single FIGURE is a diagrammatic sectional view of a sintering machine equipped with my apparatus for handling dust-laden air.

The drawing shows a conventional downdraft traveling grate sintering machine, which comprises a grate 10, a feeder 12, an ignition hood 13, windboxes 14 and an exhaust plenum chamber 15. The feeder delivers sinter mix M to the grate adjacent its entry end, where it is laid down to form a permeable bed B. The ignition hood ignites the material of the bed at its upper surface just beyond the feeder. Combustion air is drawn or forced through the bed, passes through the windboxes and plenum chamber, and exhausts through a stack, not shown. Combustion of the material of the bed takes place through a thin zone which slopes downwardly from the ignition hood to a "burn-through" point adjacent the discharge end of the grate. Finished sinter discharges from the grate to a screen 16 and conveyor 17. A dust hood 18 covers the screen and the discharge end of the grate. A pipe 20 leads from the dust hood to the inlet of a cyclone 21. A pipe 22 leads from the air outlet of the cyclone to the inlet side of an exhaust fan 23. The fan draws air through the hot sinter as it breaks on discharging from the grate to carry away the dust and cool the sinter to some extent. The cyclone recovers most of this dust, which subsequently is recycled.

In accordance with the present invention, a pipe 24 connects the discharge side of fan 23 with a hood 25 located over grate 10 immediately beyond the ignition hood 13. A pipe 26 is connected to pipe 24 to furnish an outlet to the atmosphere. Pipe 26 is equipped with a damper 27 which can be adjusted to regulate the relative distribution of air going to hood 25 and exhausting to the atmosphere. I wish to maintain a slightly negative pressure within the hood and I adjust the damper accordingly. Preferably the apparatus includes an automatic controller 28 for adjusting the damper. I show this controller only in block diagram, since per se it is of conventional construction.

As already mentioned, air leaving the cyclone still carries a significant quantity of dust and it is at a relatively high temperature. I direct a large portion of this air back to the sinter bed, where the dust blends into the sinter and sensible heat is utilized in promoting combustion of the material in the bed. It is critical to the successful practice of my invention that I pass the dust-laden air first through a cyclone or the equivalent, which collects the major part of the dust. Otherwise the dust content of the air would be so high that the bed would clog, overload the fans, and prevent proper combustion. It is also critical that I direct air from the cyclone to the portion of the bed immediately adjacent the ignition hood, where the temperature of the bed surface is at a maximum. In this way the dust can be fused into the sinter, rather than merely remaining as loose dust.

While I have shown and described only a single embodiment of my invention, it is apparent that modifications may arise. Therefore, I do not wish to be limited to the disclosure set forth but only by the scope of the appended claims.

I claim:
1. In a sintering process in which a combustible sinter mix is delivered to a traveling grate and laid down as a permeable bed thereon, the bed is ignited at its upper surface, a downdraft of air passes through the bed to maintain a combustion zone which slopes downwardly from the point of ignition to a "burn-through" point adjacent the discharge end of the grate, and finished sinter discharges from the grate and breaks into fragments with formation of dust, the temperature of the upper surface of the bed being at a maximum immediately adjacent the point of ignition, the combination therewith of a method of handling dust thus formed comprising passing air through the sinter as it breaks on discharging from the grate and thereby picking up dust, separating from this air the major portion of the dust which it has picked up but leaving a minor portion of the dust entrained therein, thereafter directing at least a portion of the latter air and entrained dust back to upper surface of the sinter bed immediately adjacent the point of ignition, and blending and fusing the dust from this air into the bed.

2. The combination, with a sintering machine which includes a traveling grate, a feeder for delivering combustible sinter mix to said grate and laying down the mix as a permeable bed thereon, means for igniting the bed at its upper surface, means for passing a downdraft of air through the bed to maintain a combustion zone which slopes downwardly from the point of ignition to a "burn-through" point adjacent the discharge end of the grate, and means for receiving finished sinter as it discharges from the grate and breaks with formation of dust, the temperature of the upper surface of the bed being at a maximum immediately adjacent the point of ignition, of an apparatus for handling dust thus formed comprising a hood which covers said sinter-receiving means and the discharge end of the grate, means for passing air through said hood and thereby carrying away dust, dust collecting means through which dust laden air from said hood passes to recover the major portion of the dust therefrom but leaving a minor portion of the dust entrained therein, and means for directing at least a portion of the air and entrained dust from said dust collecting means back to the upper surface of the sinter bed immediately adjacent the point of ignition where the temperature is sufficient to fuse the dust from this air into the bed.

References Cited in the file of this patent

UNITED STATES PATENTS

| | | |
|---|---|---|
| 1,928,702 | O'Mara | Oct. 3, 1933 |
| 2,148,052 | Ahlmann | Feb. 21, 1939 |
| 2,254,323 | Shallock | Sept. 2, 1941 |
| 2,654,588 | Somogyi | Oct. 6, 1953 |
| 2,750,274 | Lellep | June 12, 1956 |